United States Patent
Mashiba (10) Patent No.: US 7,587,147 B2
(45) Date of Patent: Sep. 8, 2009

(54) FIXING APPARATUS AND IMAGE FORMING APPARATUS WITH TEMPERATURE CONTROL

(75) Inventor: Tamaki Mashiba, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 450 days.

(21) Appl. No.: 11/488,129

(22) Filed: Jul. 18, 2006

(65) Prior Publication Data
US 2007/0065165 A1    Mar. 22, 2007

(30) Foreign Application Priority Data
Sep. 20, 2005    (JP)    ............... 2005-272640

(51) Int. Cl.
*G03G 15/20*    (2006.01)
(52) U.S. Cl. .......................... 399/33; 399/69
(58) Field of Classification Search ............ 399/33, 399/67, 69
See application file for complete search history.

(56) References Cited

U.S. PATENT DOCUMENTS 4,821,062 A * 4/1989 Katoh et al. ................. 399/33
7,242,880 B2 * 7/2007 Sone et al. ................... 399/33

FOREIGN PATENT DOCUMENTS

| JP | 2000-227732 | 8/2000 |
| JP | 2001-109316 | 4/2001 |
| JP | 2002-372892 | 12/2002 |

\* cited by examiner

*Primary Examiner*—William J Royer
(74) *Attorney, Agent, or Firm*—Nixon & Vanderhye, P.C.

(57) ABSTRACT

A fixing apparatus includes a heating roller having a heating unit and a press roller that is in contact with the heating roller. The fixing apparatus fixes an image of developer onto a sheet holding the image by heating and supporting the sheet. The fixing apparatus comprises a first sensor for detecting radiant heat from the heating roller, a second sensor for detecting the ambient temperature of the first sensor, a determination unit for determining whether the temperature of the heating roller is abnormal or not based on an output value of the first sensor and an output value of the second sensor, and a control unit for controlling an operating state of the heating unit based on the determination result.

16 Claims, 8 Drawing Sheets

FIXING APPARATUS AND IMAGE FORMING APPARATUS WITH TEMPERATURE CONTROL

CROSS-REFERENCE TO RELATED APPLICATIONS

This Nonprovisional application claims priority under 35 U.S.C. §119(a) on Patent Application No. 2005-272640 filed in Japan on Sep. 20, 2005, the entire contents of which are hereby incorporated by reference.

BACKGROUND OF THE INVENTION

1. Field of the Invention

The present invention relates to a fixing apparatus and an image forming apparatus capable of preventing excessive temperature rise of a heating roller.

2. Description of Related Art

A fixing apparatus using a heating method is widely used to fix toner, which is used for an image forming apparatus such as a copying machine or a printer, onto recording paper. A fixing apparatus using a heating method is provided with a heating roller, which has heating means such as a heater, and a press roller, which is in contact with the heating roller with pressure, and is constructed to convey and support recording paper, which has a toner image transferred thereto, between the heating roller and the press roller, and to melt and, further, pressurize toner on the recording paper, so as to fix the toner image onto the recording paper.

It is necessary for such a fixing apparatus to reliably melt toner on the recording paper and to precisely control the surface temperature of the heating roller in order to avoid bad influence on the recording paper. Conventionally, the surface of the heating roller is pressed by a plurality of thermistors and the temperature of a plurality of positions on the surface of the heating roller is detected to control electric conduction to the heater, so as to maintain an even surface temperature of the entire heating roller.

It is however necessary to press a thermistor with a suitable pressure when a thermistor is used for measuring the surface temperature of the heating roller precisely. Consequently, such a fixing apparatus has a problem that the surface of the heating roller deteriorates due to friction between the thermistor and the surface of the heating roller and the fixing strength deteriorates when the thermistor is pressed against one position of the heating roller. Such a fixing apparatus also has another problem that the temperature cannot be detected precisely when dirt on the surface of the heating roller adheres to the surface of the thermistor.

In order to solve these problems, a fixing apparatus and an image forming apparatus provided with a non-contact temperature sensor have been suggested (see Japanese Patent Application Laid-Open No. 2000-227732 and Japanese Patent Application Laid-Open No. 2001-109316, for example). Known as a non-contact temperature sensor is one having an infrared ray sensor, which detects the surface temperature of the heating roller by detecting radiant heat (infrared ray) from the surface of the heating roller with the infrared ray sensor.

A non-contact temperature sensor described in the above patent documents includes a thermistor for infrared ray detection and a thermistor for temperature compensation. The thermistor for infrared ray detection detects an infrared ray to be radiated from the surface of the heating roller and the output voltage thereof depends on the ambient temperature (i.e. the temperature of the thermistor for infrared ray detection itself).

It is necessary to detect the temperature of the thermistor for infrared ray detection itself in order to compensate such temperature dependence. The thermistor for temperature compensation is therefore placed in a position, which is near a sensor for infrared ray detection, free of the influence of the infrared ray to be radiated from the surface of the heating roller. The temperature of the surface of the heating roller can be obtained indirectly by fetching output voltage values of the two thermistors arranged as described above and carrying out an operation with operation means such as a CPU.

However, these thermistors, which are different from a contact temperature sensor in that the temperature of the surface of the heating roller is not observed directly, have a problem that excessive temperature rise of the heating roller cannot be detected immediately.

BRIEF SUMMARY

The technology disclosed herein provides a fixing apparatus and an image forming apparatus, which comprise a first sensor for detecting radiant heat from a heating roller and a second sensor for detecting the ambient temperature of the first sensor and is constructed to determine whether the temperature of the heating roller is abnormal or not based on output values of the first and second sensors and control an operating state of heating means based on a determination result, so that excessive temperature rise can be prevented by breaking electric conduction to the heating means when it is estimated that the temperature of the heating roller is abnormal and safety can be improved.

A fixing apparatus according to the technology disclosed herein is a fixing apparatus, which comprises a heating roller having a heating unit, a pressure roller pressed against the heating roller, a fixing unit for holding and heating a sheet, which carries an image formed by a developer, between the heating roller and the pressure roller so as to fix the image on to the sheet, a first sensor for detecting radiant heat from the heating roller, a second sensor for detecting an ambient temperature of the first sensor; and a controller capable of performing operations of determining whether the temperature of the heating roller is abnormal or not based on an output value of the first sensor and an output value of the second sensor and controlling an operating state of the heating unit based on the determination result In the technology disclosed herein, since determination can be made using an existing non-contact infrared ray temperature sensor and the heating means can be stopped by a hardware structure when the surface temperature of the heating roller becomes abnormal, excessive temperature rise of the heating roller can be prevented and safety is improved.

A fixing apparatus according to the technology disclosed herein is characterized in that the controller is further capable of performing operations of executing a predetermined calculation using the output value of the first sensor and the output value of the second sensor and comparing magnitude of the calculation result and a threshold set for the calculation result, wherein it is determined whether the temperature of the heating roller is abnormal or not based on the comparison result.

In the technology disclosed herein, a determination can be made by executing an operation using output values of the first sensor for detecting radiant heat from the heating roller and the second sensor for detecting the ambient temperature of the first sensor and comparing the operation result and the threshold.

A fixing apparatus according to the technology disclosed herein is characterized in that the controller is constructed to calculate a difference value between the output value of the first sensor and the output value of the second sensor and compare magnitude of the calculated difference value and a threshold set for the difference value, wherein it is determined whether the temperature of the heating roller is abnormal or not based on the comparison result.

In the technology disclosed herein, a determination can be made by carrying out a difference operation using output values of the first sensor for detecting radiant heat from the heating roller and the second sensor for detecting the ambient temperature of the first sensor and comparing the difference value and the threshold.

A fixing apparatus according to the technology disclosed herein is characterized in that a plurality of thresholds to be compared with are set in accordance with the output value of the second sensor.

In the technology disclosed herein, a determination can be made without depending on an output value of the second sensor since a plurality of thresholds to be compared with are set according to an output value of the second sensor.

A fixing apparatus according to the technology disclosed herein is characterized in that the controller is further capable of causing the heating unit to stop heating when it is determined that the temperature of the heating roller is abnormal.

In the technology disclosed herein, excessive temperature rise of the heating roller is prevented since heating by the heating means is stopped when it is determined that the temperature of the heating roller is abnormal.

A fixing apparatus according to the technology disclosed herein is characterized in that the heating unit is constructed to generate heat upon electric conduction, and further comprises an electric conduction unit for allowing electric conduction to the heating unit; and a switching circuit for stopping electric conduction by the electric conduction unit when it is determined that the temperature of the heating roller is abnormal.

In the technology disclosed herein, excessive temperature rise of the heating roller is prevented by a hardware structure since electric conduction to the heating means is stopped and heating is stopped when it is determined that the temperature of the heating roller is abnormal.

An image forming apparatus according to the technology disclosed herein is characterized by comprising an accepting unit for accepting image data, a transfer unit for transferring an image formed by a developer onto a sheet based on the accepted image data, and a fixing apparatus described above; wherein an image is formed by fixing an image on the sheet, which has been transferred by the transfer unit, with the fixing apparatus.

The technology disclosed herein can be applied to a fixing apparatus provided in an image forming apparatus such as a printer or a digital complex machine.

With the technology disclosed herein, a determination is made by carrying out an operation using output values of the first sensor for detecting radiant heat from the heating roller and the second sensor for detecting the ambient temperature of the first sensor and comparing the operation result and the threshold. Since, for example, a differential amplifier circuit can be used as operation means and a comparator can be used as comparing means, determination can be made by a hardware structure, heating can be stopped immediately when the surface temperature of the heating roller becomes abnormal and excessive temperature rise of the heating roller can be prevented.

With the technology disclosed herein a determination can be made by carrying out a difference operation using output values of the first sensor for detecting radiant heat from the heating roller and the second sensor for detecting the ambient temperature of the first sensor and comparing the difference value and the threshold. Since, for example, a differential amplifier circuit can be used as means for computing a difference and a comparator can be used as comparing means, determination can be made by a hardware structure, heating can be stopped immediately when the surface temperature of the heating roller becomes abnormal and excessive temperature rise of the heating roller can be prevented.

With the technology disclosed herein, heating by the heating means is stopped when it is determined that the temperature of the heating roller is abnormal. Consequently, excessive temperature rise of the heating roller can be prevented and safety can be improved.

With the technology disclosed herein, electric conduction to the heating means is stopped and heating is stopped when it is determined that the temperature of the heating roller is abnormal. Consequently, heating can be stopped immediately by a hardware structure when the temperature of the heating roller is abnormal and safety can be improved.

The above and further objects and features of the invention will more fully be apparent from the following detailed description with the accompanying drawings.

DETAILED DESCRIPTION OF THE DRAWINGS

The following description will explain the technology disclosed herein with reference to the drawings showing some embodiments thereof.

Embodiment 1

Figure 1:
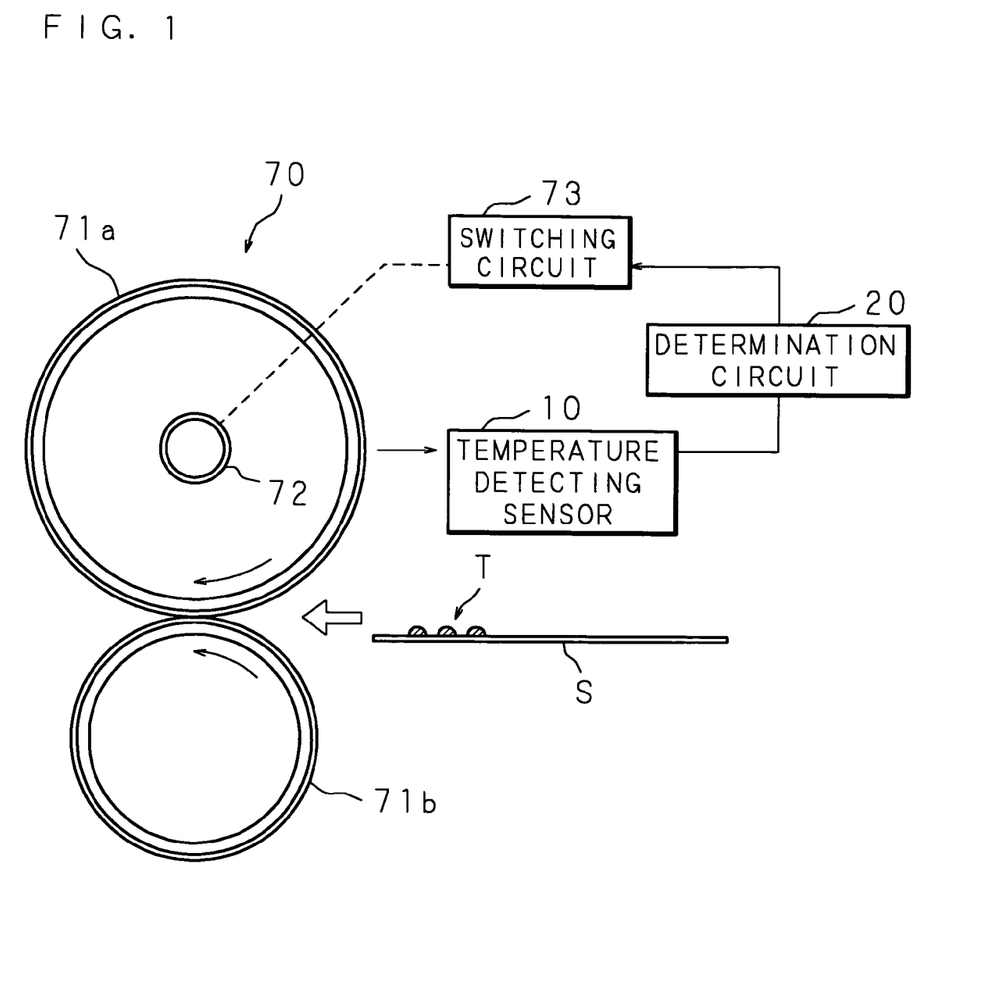
FIG. 1 is a schematic view showing the main structure of an image forming apparatus according to the present embodiment.

FIG. 1 is a schematic view showing the main structure of an image forming apparatus according to the present embodiment. The image forming apparatus according to the present embodiment forms an image by an electrophotographic method and transfers an image (toner image T) of developer onto a sheet S such as a recording sheet or an OHP film. The sheet S having the toner image T transferred thereto is conveyed along a predetermined paper path and the toner image T is fixed onto the sheet S by the action of a heating roller 71a and a press roller 71b while the sheet S passes through a fixing apparatus 70. The sheet S having the toner image T fixed thereon is further conveyed along a predetermined paper path and taken out from the apparatus.

The heating roller 71a provided in the fixing apparatus 70 is composed of a hollow and cylindrical cored bar and a mould releasing layer which is formed outside thereof. The cored bar is formed of metal, such as iron, stainless steel, aluminum or copper, or an alloy of these metals, and has a diameter of approximately 40 mm and a thickness of approximately 1.3 mm. The mould releasing layer is formed by coating the cored bar with synthetic resin such as silicone rubber, fluororubber or fluorocarbon resin such as PTA (copolymer of tetrafluoroethylene and perfluoroalkyl vinyl ether) or PTFE (polytetrafluoroethylene). The mould releasing layer has a thickness of approximately 25 μm.

A heater 72 which functions as heating means is provided inside the heating roller 71a. A rod-like halogen lamp can be used as the heater 72. Upon electric conduction from outside, the heater 72 emits light and radiates an infrared ray. The infrared ray radiated from the heater 72 heats the inner circumferential surface of the heating roller 71a (i.e. the inner circumferential surface of the cored bar). The fixing apparatus 70 maintains a roughly constant surface temperature of the heating roller 71a by operating on off control of the heater 72.

The press roller 71b provided in the fixing apparatus 70 is placed on the opposite side of a paper path of the sheet S from the heating roller 71a. The press roller 71b is composed of a hollow and cylindrical cored bar, a heat-resistant and elastic material layer which is formed outside thereof and a mould releasing layer which is formed further outside thereof. The cored bar and the mould releasing layer are generally formed of the same materials as the cored bar and mould releasing layer used for the heating roller 71a. The heat-resistant and elastic material layer is made of silicone rubber or the like and is formed outside the cored bar to have a thickness of approximately 6 mm. A biasing member (not illustrated) such as a pressing spring applies biasing force of a predetermined magnitude to the press roller 71b in the direction of the heating roller 71a and, as a result, a fixing nip having a width of approximately 6 mm is formed at a pressure contact part of the heating roller 71a and the press roller 71b.

The fixing apparatus 70 also comprises a temperature detecting sensor 10 for detecting the surface temperature of the heating roller 71a. It is possible to maintain a roughly constant surface temperature of the heating roller 71a by operating on off control of the heater 72 based on the output of the temperature detecting sensor 10. The present embodiment further comprises a determination circuit 20 for determining whether the surface temperature of the heating roller 71a is abnormal or not based on the output of the temperature detecting sensor 10 and a switching circuit 73 for breaking electric conduction to the heater 72 when it is determined that the surface temperature is abnormal. The determination circuit 20, which will be explained later in detail, determines that the surface temperature of the heating roller 71a is abnormal when it is estimated that the surface temperature is higher than a predetermined temperature (250° C., for example).

Figure 2:
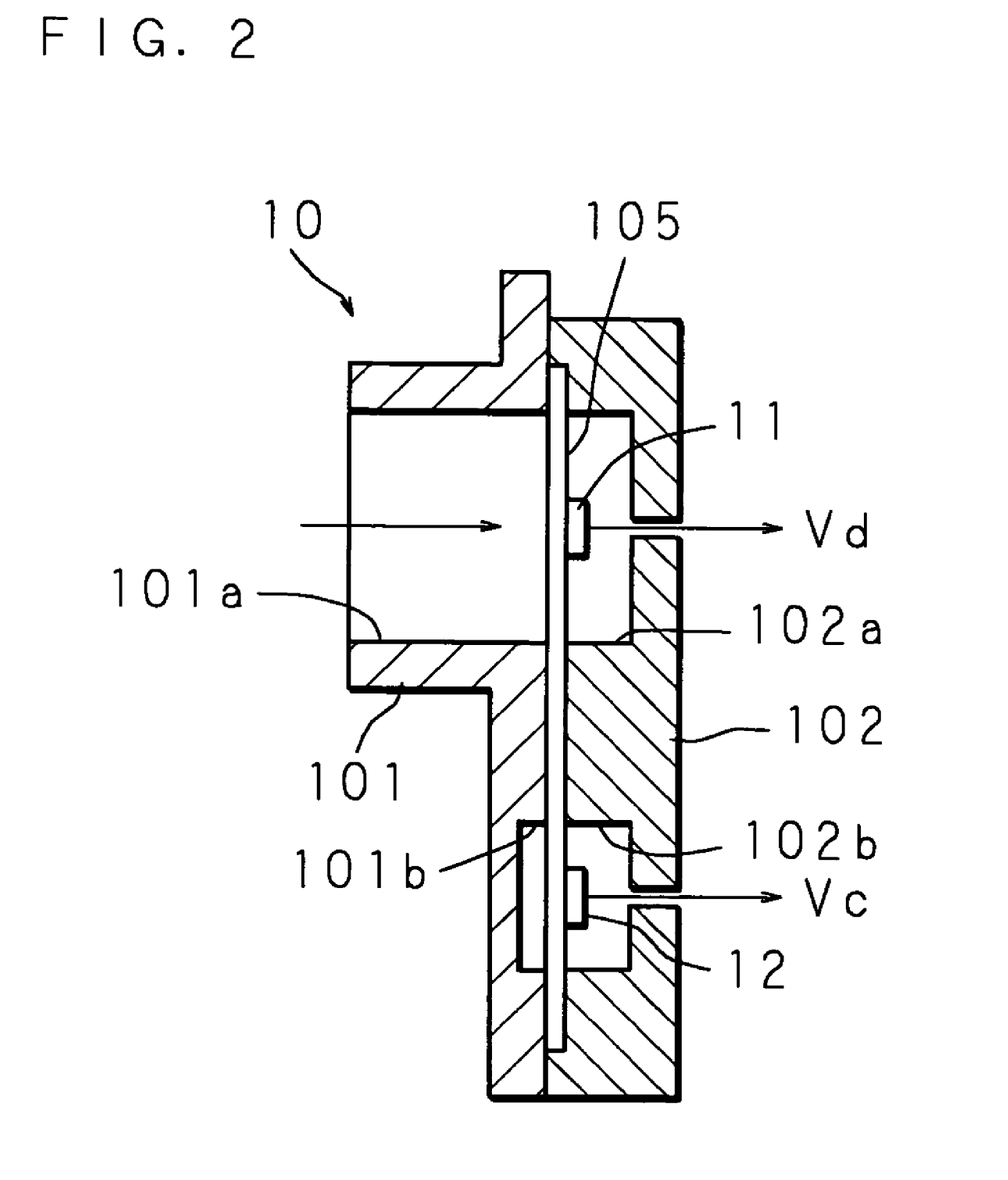
FIG. 2 is a sectional view showing the structure of a temperature detecting sensor.

The temperature detecting sensor 10 used in the present embodiment is a non-contact temperature sensor for detecting radiant heat (infrared ray) from the surface of the heating roller 71a. The following description will explain the structure thereof. FIG. 2 is a sectional view showing the structure of the temperature detecting sensor 10. The temperature detecting sensor 10 is a sensor having a thermistor 11 for infrared ray detection and a thermistor 12 for compensation inside of a case. The case of the temperature detecting sensor 10 is composed of a holding member 101 and a cover member 102. The holding member 101 and the cover member 102 are formed of metal material, such as aluminum, having a large thermal conductivity and a small thermal emissivity.

The holding member 101 is provided with an opening 101a for taking in an infrared ray radiated from the heating roller 71a. Moreover, a recess 101b is provided at a suitable distance from the opening 101a. The cover member 102 is fixed to the holding member 101 with an infrared ray absorbing film 105 sandwiched therebetween. A blackbody absorbing film can be used as the infrared ray absorbing film 105. The cover member 102 comprises a space part 102a which is provided opposite to the opening 101a of the holding member 101 and another space part 102b which is provided opposite to the recess 101b. The thermistor 11 for infrared ray detection is placed above the infrared ray absorbing film 105 in a space defined by the infrared ray absorbing film 105 and the space part 102a of the cover member 102. Moreover, the thermistor 12 for compensation is placed above the infrared ray absorbing film 105 in a space defined by the infrared ray absorbing film 105 and the space part 102b of the cover member 102.

When an infrared ray from the heating roller 71a enters the infrared ray absorbing film 105 through the opening 101a, the infrared ray is absorbed by the infrared ray absorbing film 105. The temperature of the infrared ray absorbing film 105 rises depending on the absorbed infrared ray dose. The temperature of the infrared ray absorbing film 105 is detected as end-to-end voltage Vd of the thermistor 11 for infrared ray detection placed above the infrared ray absorbing film 105. In this regard, since the thermistor 11 for infrared ray detection is under the influence of the ambient temperature environment (influence of the holding member 101 and the cover member 102, for example), it is necessary to eliminate the influence in order to detect the surface temperature of the heating roller 71a. To achieve such purposes, the thermistor 12 for compensation is placed in a position free of direct influence of the infrared ray and the thermistor 11 for infrared ray detection is compensated by detecting the end-to-end voltage Vc of the thermistor 12 for compensation. The fixing apparatus 70 thus can detect the surface temperature of the heating roller 71a based on the output of the temperature detecting sensor 10.

Figure 3:
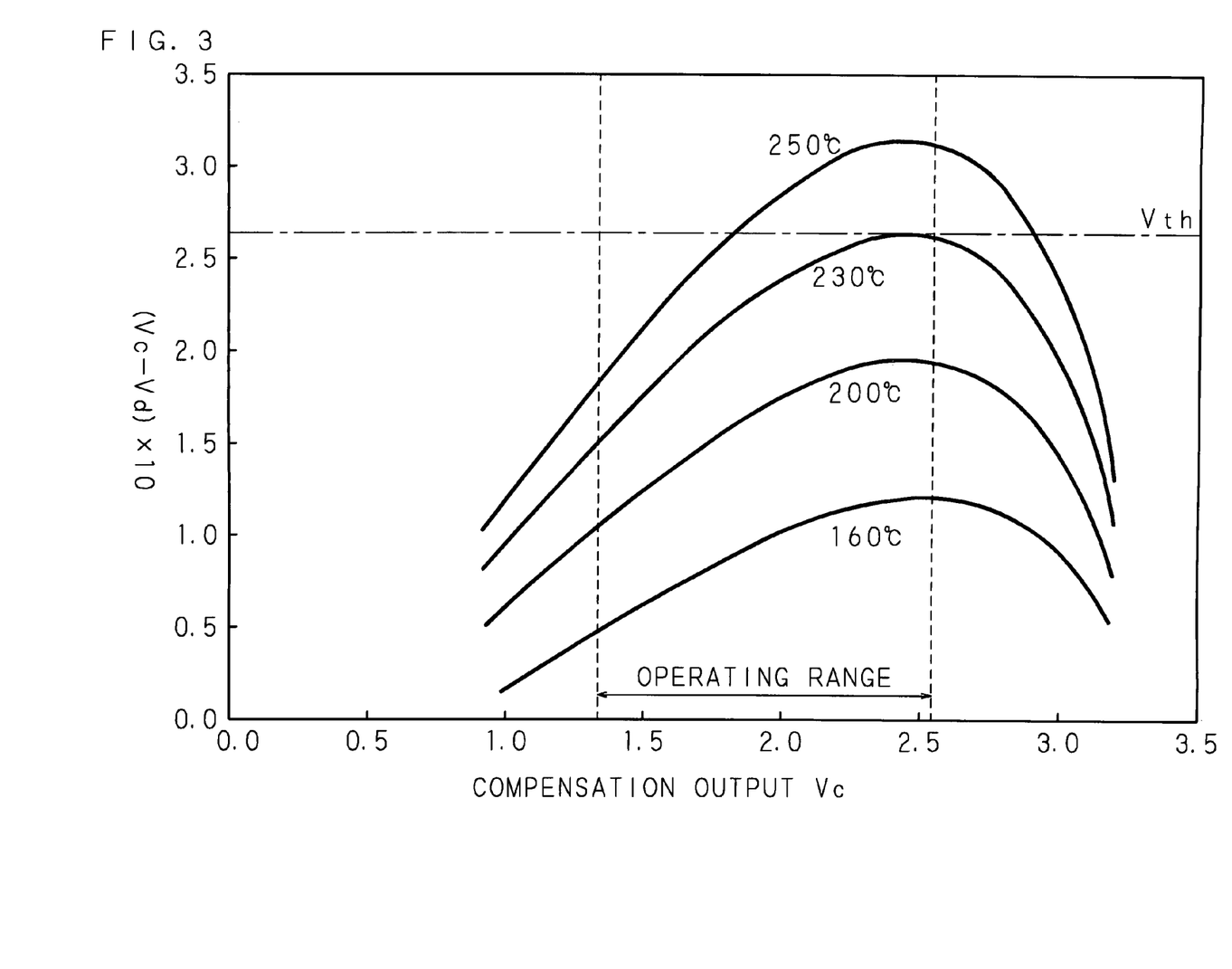
FIG. 3 is a graph showing the relation between the output of a temperature detecting sensor and the surface temperature of a heating roller.

FIG. 3 is a graph showing the relation between the output of the temperature detecting sensor 10 and the surface temperature of the heating roller 71a. The abscissa axis of the graph is for a compensation output Vc which is the output value of the thermistor 12 for compensation while the ordinate axis is for a value (which will be hereinafter referred to simply as a difference output) which is obtained by amplifying 10-fold a difference of a sensor output Vd which is the output voltage of the thermistor 11 for infrared ray detection and the compensation output Vc. The surface temperature of the heating roller 71a can be obtained by detecting the compensation output Vc and the difference output (Vc−Vd)×10. For example, when the compensation output Vc is 2.5V and the difference output (Vc−Vd)×10 is 1.2V, the surface temperature of the heating roller 71a becomes 160° C. Similarly, in the case of the compensation output Vc of 2.5 V, the surface temperature becomes 200° C. when the difference output (Vc−Vd)×10 is 1.9 V, the surface temperature becomes 230° C. when the difference output is 2.6 V and the surface temperature becomes 250° C. when the difference output is 3.1 V. Consequently, the surface temperature of the heating roller 71a can be obtained by preliminarily holding a table of digitized triadic relations between the compensation output Vc, the difference output (Vc−Vd)×10 and the surface temperature and reading out an appropriate surface temperature from the table when the compensation output Vc and the difference output (Vc−Vd)×10 are detected.

It is also possible to set a threshold Vth for the value of the difference output (Vc−Vd)×10 so that the surface temperature of the heating roller 71a does not reach a predetermined temperature. For example, when it is required to keep the surface temperature of the heating roller 71a from exceeding 250° C., the threshold Vth is set to 2.63 V. When the difference output (Vc−Vd)×10 is equal to or smaller than 2.63 V, it is clear that the surface temperature of the heating roller 71a does not exceed 250° C. as long as the compensation output Vc is within a predetermined range. Consequently, it is possible to prevent excessive temperature rise of the heating roller 71a by comparing the magnitude of the difference output (Vc−Vd)×10 and the threshold Vth and controlling the switching circuit 73 to stop electric conduction to the heater 72 when the magnitude of the difference output (Vc−Vd)×10 exceeds the threshold Vth.

However, the reference condition described above cannot be applied always to the entire range of the compensation output Vc when the threshold Vth is set for the difference output (Vc−Vd)×10. For example, when the compensation output Vc is equal to or smaller than 1.75 V or when the compensation output Vc is equal to or larger than 2.8 V, the surface temperature of the heating roller 71a becomes a value larger than 250° C. even though the magnitude of the difference output (Vc−Vd)×10 is equal to or smaller than the threshold Vth (=2.63 V).

In order to deal with such a problem, a predetermined calculation is carried out using the values of the sensor output Vd and the compensation output Vc and determination is made by comparing the operation result and a new threshold V0, instead of comparison between the difference output (Vc−Vd)×10 and the threshold Vth.

Figure 4:
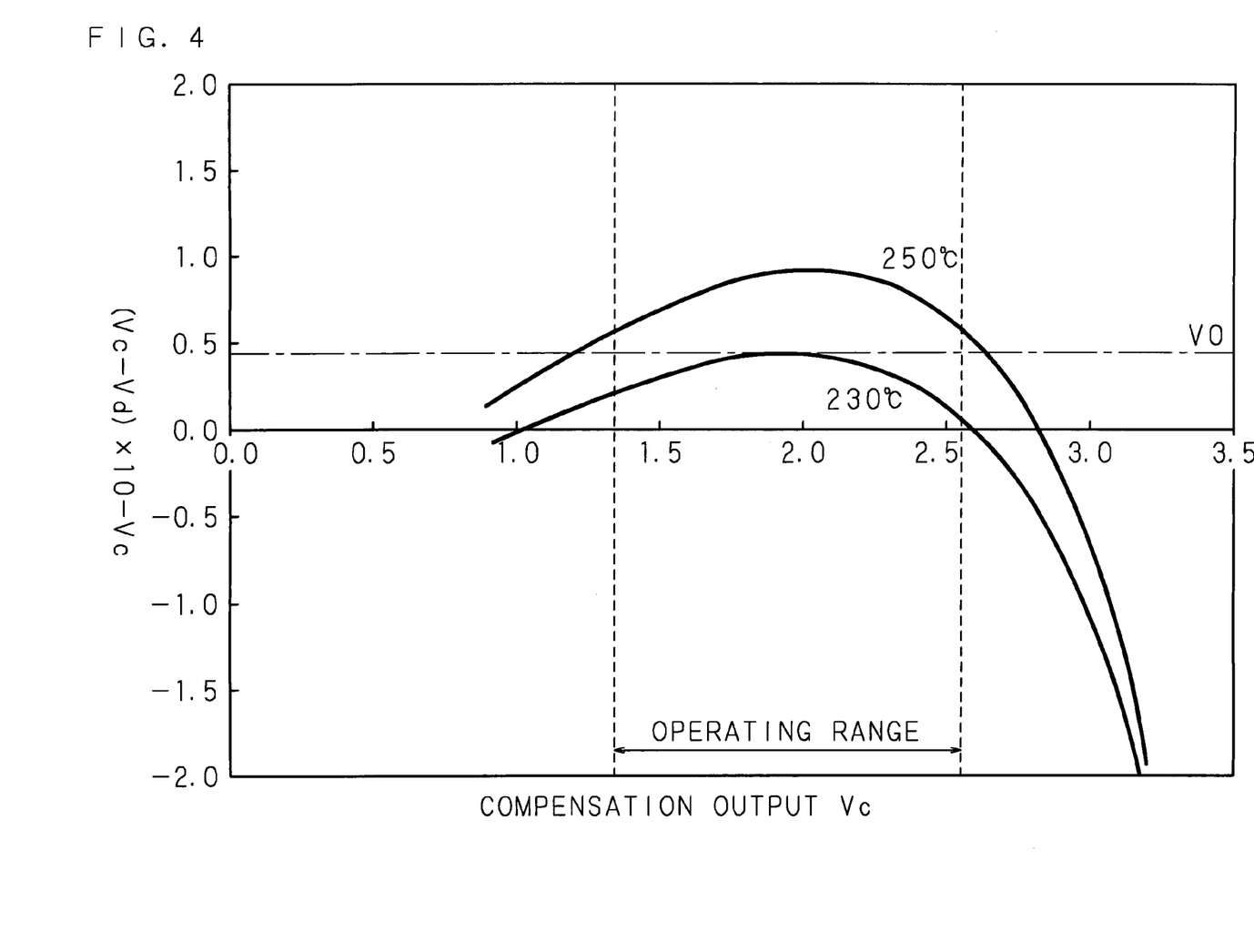
FIG. 4 is a graph showing the relation between the output of a temperature detecting sensor and the surface temperature of a heating roller.

FIG. 4 is a graph showing the relation between the output of the temperature detecting sensor 10 and the surface temperature of the heating roller 71a. The abscissa axis of the graph is for a compensation output Vc while the ordinate axis is for the result of an operation using the values of a sensor output Vd and the compensation output Vc. In the present embodiment, the value of (Vc−Vd)×10−Vc is computed by a circuit which will be explained later. For example, when it is required to keep the surface temperature of the heating roller 71a from exceeding 250° C., the threshold V0 is set to 0.4 V. It is clear from the graph shown in FIG. 4 that the surface temperature of the heating roller 71a does not exceed 250° C. as long as the compensation output Vc is within a predetermined range, when the value of (Vc−Vd)×10−Vc is equal to or smaller than 0.4 V.

In case of comparison between such operation result and the threshold V0, it is possible to expand the determination range. In the case explained with reference to FIG. 3 for which the threshold Vth is set to 2.63 V in order to keep the surface temperature from exceeding 250° C., determination using this threshold Vth can be made only when the compensation output Vc is within a range of 1.75 V -2.8 V. On the other hand, in the case explained with reference to FIG. 4, the threshold V0 is set to 0.4 V in order to keep the surface temperature from exceeding 250° C. Determination using this threshold V0 can be applied to a case where the compensation output Vc is within a range of 1.2 V-2.7 V. Determination can be made in a range of normal use shown with broken lines in the graph, though determination still cannot be made when the compensation output Vc is out of this range. Here, the range of normal use means a range of the compensation output Vc corresponding to the compensation temperature (60° C.-120° C.) of a running fixing apparatus 70.

Figure 5:
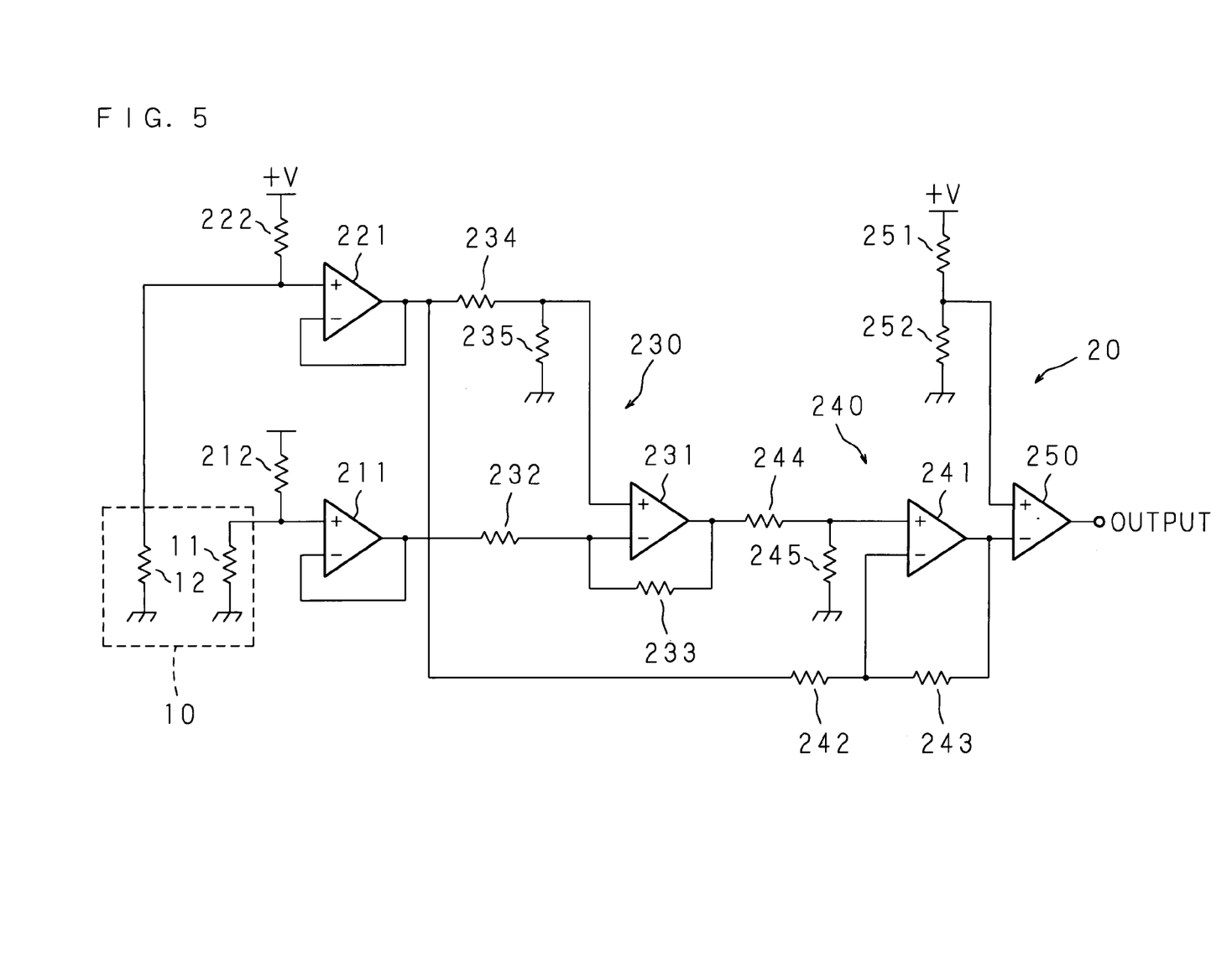
FIG. 5 is a circuit diagram showing an example of a determination circuit.

Next, the determination circuit 20 for realizing the determination method explained with reference to FIG. 4 will be explained. FIG. 5 is a circuit diagram showing an example of the determination circuit 20. The thermistor 11 for infrared ray detection is connected in series with a resistance element 212 and an output voltage (sensor output Vd) of the thermistor 11 for infrared ray detection is taken out by a voltage follower circuit 211 constituted of an operational amplifier. Similarly, the thermistor 12 for compensation is connected in series with a resistance element 222 and an output voltage (compensation output Vc) of the thermistor 12 for compensation is taken out by a voltage follower circuit 221 constituted of an operational amplifier.

The sensor output Vd of the thermistor 11 for infrared ray detection and the compensation output Vc of the thermistor 12 for compensation are inputted into a differential amplifier circuit 230 composed of an operational amplifier 231 and resistance elements 232-235. Regarding the resistance values of the resistance elements 232-235, for example, the resistance values of the resistance elements 232 and 234 are 10 kΩ and the resistance values of the resistance elements 233 and 235 are 100 kΩ. Consequently, this differential amplifier circuit 230 amplifies 10-fold the difference value (Vc−Vd) of the sensor output Vd and the compensation output Vc.

The output (Vc−Vd)×10 of the differential amplifier circuit 230 and the compensation output Vc of the thermistor 12 for compensation are inputted into a differential amplifier circuit 240 which is connected at a further subsequent stage. The differential amplifier circuit 240 is composed of an operational amplifier 241 and resistance elements 242-245. Each resistance value of the resistance elements 242-245 is 10 kΩ. Consequently, this differential amplifier circuit 240 outputs the difference value (Vc−Vd)×10−Vc of the output (Vc−Vd)×10 of the differential amplifier circuit 230 and the compensation output Vc.

In the technology disclosed herein, these two differential amplifier circuits 230 and 240 function as operation means for carrying out a predetermined calculation using the output value (Vd) of the thermistor 11 for infrared ray detection and the output value (Vc) of the thermistor 12 for compensation.

The output of the differential amplifier circuit 240 is inputted into one input terminal of a comparator 250. Moreover, inputted into the other terminal of the comparator 250 is a voltage signal which is set as a threshold V0. For example, when the threshold V0 is set to 0.5 V, the power supply voltage of 3.3 V is to be divided into a resistance element 251 of 28 kΩ and a resistance element 252 of 5 kΩ. The comparator 250 outputs a low level signal when the difference value (Vc−Vd)×10−Vc is larger than the threshold V0, and outputs a high level signal when the difference value is smaller than the threshold V0.

In other words, when it is estimated that the surface temperature of the heating roller 71a is abnormal, the determination circuit 20 shown in FIG. 5 outputs a low level signal as a determination result. It is therefore possible to prevent excessive temperature rise of the heating roller 71a by using the switching circuit 73 for breaking electric conduction to the heater 72 when the determination circuit 20 outputs a low level signal.

It should be noted that the differential amplifier circuit 240 may be omitted when determination is made using the difference output (Vc−Vd)×10 and the threshold Vth, though (Vc−Vd)×10−Vc is computed in the circuit diagram shown in FIG. 5 using two stages of differential amplifier circuits 230 and 240.

Figure 6:
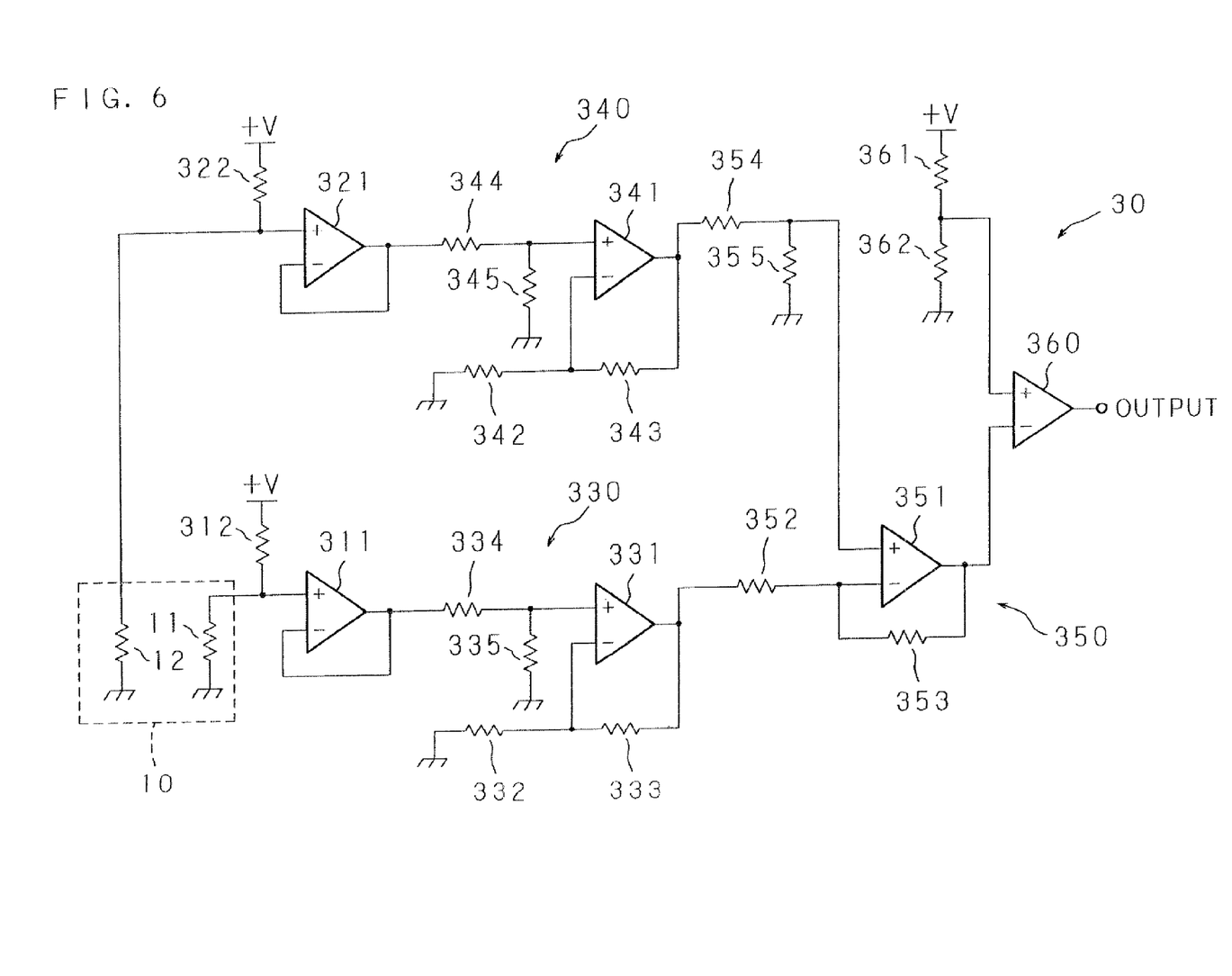
FIG. 6 is a circuit diagram showing another example of a determination circuit.

Moreover, a determination circuit for realizing the determination method described above is not limited to the determination circuit 20 shown in FIG. 5. FIG. 6 is a circuit diagram showing another example of a determination circuit.

A determination circuit 30 shown in FIG. 6 computes the value of 9 Vc−10 Vd directly and is, as a result, equivalent to the determination circuit 20.

The thermistor 11 for infrared ray detection is connected in series with a resistance element 312 and an output voltage (sensor output Vd) of the thermistor 11 for infrared ray detection is taken out by a voltage follower circuit 311 constituted of an operational amplifier. The sensor output Vd taken out is inputted into one input terminal of a differential amplifier circuit 330 composed of an operational amplifier 331 and resistance elements 332-335. The other terminal of the differential amplifier circuit 330 is grounded. Regarding the resistance values of the resistance elements 332-335, for example, the resistance values of the resistance elements 332 and 334 are 10 kΩ and the resistance values of the resistance elements 333 and 335 are 100 kΩ. Consequently, this differential amplifier circuit 330 amplifies 10-fold the sensor output Vd. The amplified voltage signal is inputted into one input terminal of a differential amplifier circuit 350 at a subsequent stage.

Similarly, the thermistor 12 for compensation is connected in series with a resistance element 322 and an output voltage (compensation output Vc) of the thermistor 12 for compensation is taken out by a voltage follower circuit 321 constituted of an operational amplifier. The compensation output Vc taken out is inputted into one input terminal of a differential amplifier circuit 340 composed of an operational amplifier 341 and resistance elements 342-345. The other input terminal of the differential amplifier circuit 340 is grounded. Regarding the resistance values of the resistance elements 342-345, for example, the resistance values of the resistance elements 342 and 344 are 10 kΩ and the resistance values of the resistance elements 343 and 345 are 90 kΩ. Consequently, this differential amplifier circuit 340 amplifies 9-fold the compensation output Vc. The amplified voltage signal is inputted into the other input terminal of the differential amplifier circuit 350 at a subsequent stage.

The differential amplifier circuit 350 is composed of an operational amplifier 351 and resistance elements 352-355. Each resistance value of the resistance elements 352-355 is 10 kΩ. This differential amplifier circuit 350 outputs a difference value 9Vc−10Vd of two voltage signals of 10Vd and 9Vc.

The output of the differential amplifier circuit 350 is inputted into one input terminal of a comparator 360. Moreover, inputted into the other terminal of the comparator 360 is a voltage signal which is set as a threshold V0. For example, when the threshold V0 is set to 0.5 V, the power supply voltage of 3.3 V is to be divided into a resistance element 361 of 28 kΩ and a resistance element 362 of 5 kΩ. The comparator 360 outputs a low level signal when the difference value 9 Vc−10 Vd is larger than the threshold V0, and outputs a high level signal when the difference value is smaller than the threshold V0.

In other words, the determination circuit 30 shown in FIG. 6 also outputs a low level signal as a determination result when it is estimated that the surface temperature of the heating roller 71a is abnormal. It is therefore possible to prevent excessive temperature rise of the heating roller 71a by using the switching circuit 73 for breaking electric conduction to the heater 72 when the determination circuit 30 outputs a low level signal.

Embodiment 2

A plurality of thresholds may be set according to the value of the compensation output Vc, though one threshold is used in Embodiment 1 to make a determination. It should be noted that explanation of the image forming apparatus will be omitted since the apparatus structure thereof is the same as that of Embodiment 1.

Figure 7:
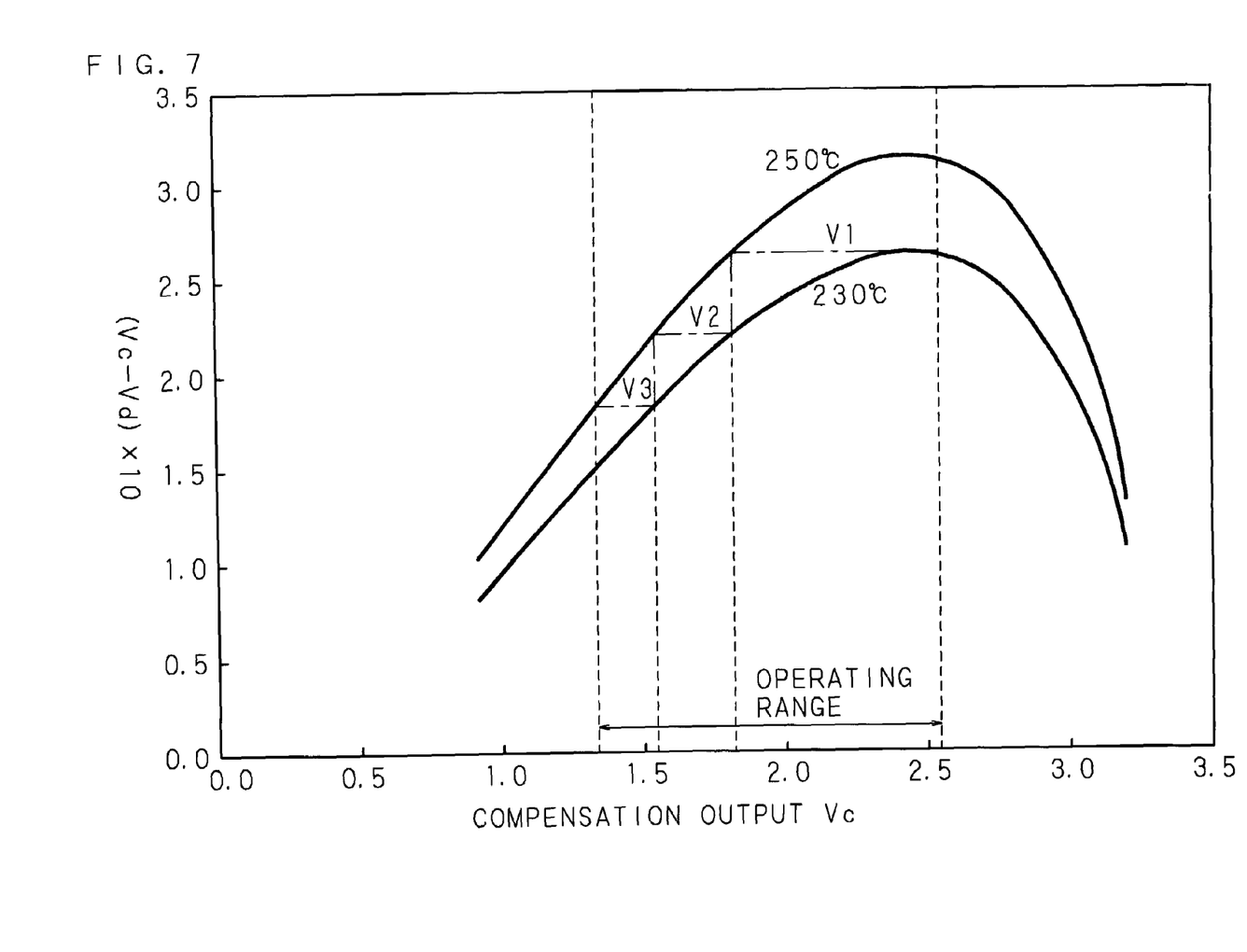
FIG. 7 is a graph for illustrating thresholds to be set in an embodiment.

FIG. 7 is a graph for illustrating thresholds to be set in the present embodiment. The abscissa axis of the graph is for a compensation output Vc which is the output voltage of the thermistor 12 for compensation while the ordinate axis is for a value (difference output) which is obtained by amplifying 10-fold a difference of a sensor output Vd which is the output voltage of the thermistor 11 for infrared ray detection and the compensation output Vc. For example, when it is required to keep the surface temperature of the heating roller 71a from exceeding 250° C., a threshold V1 is set to 2.65 V for a compensation output Vc within a range of 1.8 V-2.6 V, a threshold V2 is set to 2.2 V for a compensation output within a range of 1.6 V -1.8 V and a threshold V3 is set to 1.8 V for a compensation output within a range of 1.35 V-1.6 V. It is thus possible to preferably determine whether the surface temperature of the heating roller 71a exceeds 250° C. or not within a range of use by setting thresholds according to the value of the compensation output Vc.

Figure 8:
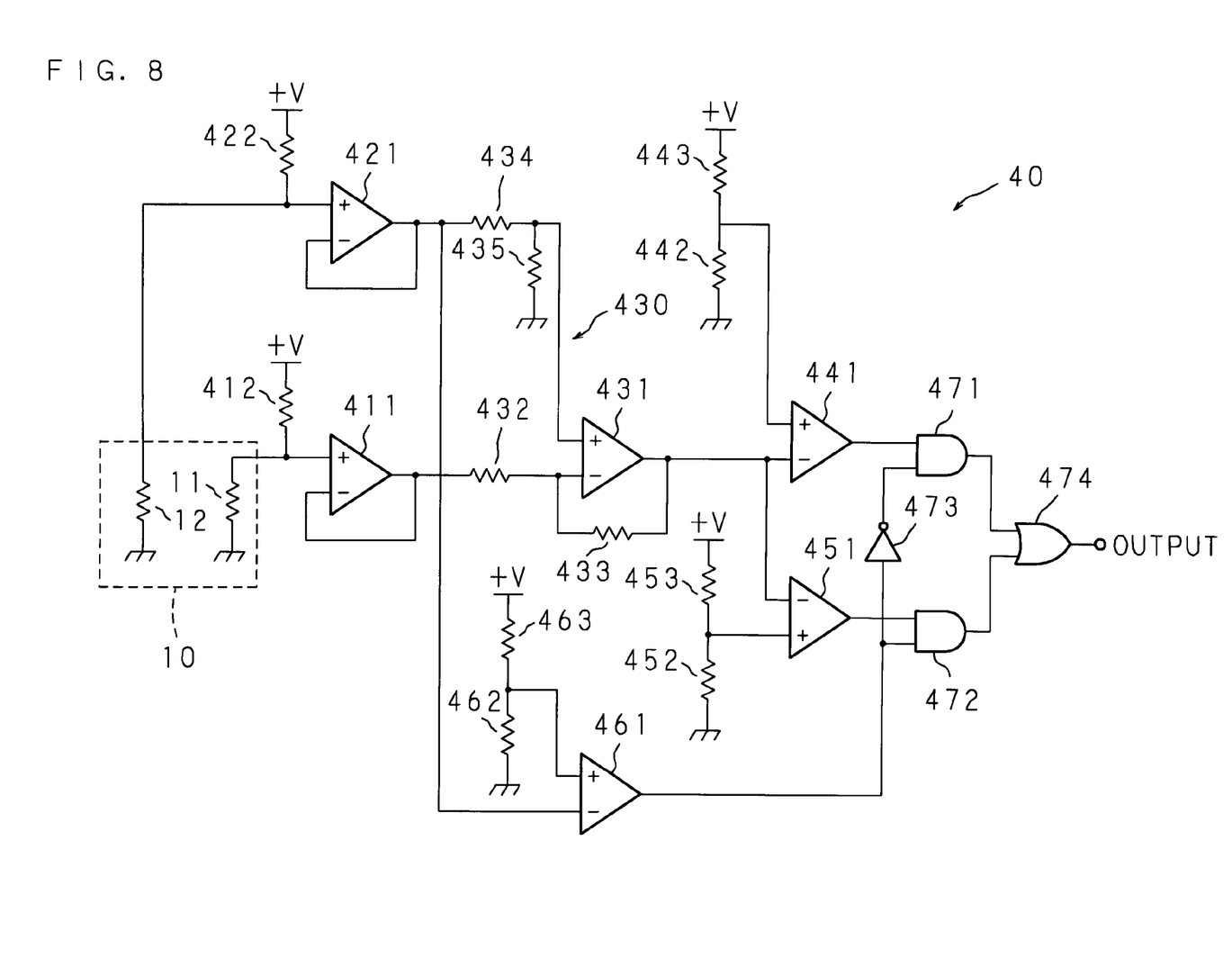
FIG. 8 is a circuit diagram showing an example of a determination circuit.

Next, a determination circuit 40 for realizing the determination method explained with reference to FIG. 7 will be explained. FIG. 8 is a circuit diagram showing an example of a determination circuit. It should be noted that, in order to simplify the circuit structure, the following description will explain a structure wherein a determination range is divided into two sections, though the determination range in FIG. 7 is divided into three sections.

The thermistor 11 for infrared ray detection is connected in series with a resistance element 412 and an output voltage (sensor output Vd) of the thermistor 11 for infrared ray detection is taken out by a voltage follower circuit 411 constituted of an operational amplifier. Similarly, the thermistor 12 for compensation is connected in series with a resistance element 422 and an output voltage (compensation output Vc) of the thermistor 12 for compensation is taken out by a voltage follower circuit 421 constituted of an operational amplifier.

The sensor output Vd of the thermistor 11 for infrared ray detection and the compensation output Vc of the thermistor 12 for compensation are inputted into a differential amplifier circuit 430 composed of an operational amplifier 431 and resistance elements 432-435. Regarding the resistance values of the resistance elements 432-435, for example, the resistance values of the resistance elements 432 and 434 are 10 kΩ and the resistance values of the resistance elements 433 and 435 are 100 kΩ. Consequently, this differential amplifier circuit 430 amplifies 10-fold the difference value (Vc−Vd) of the sensor output Vd and the compensation output Vc. In other words, in the technology disclosed herein, the differential amplifier circuit 430 functions as means for computing the difference of the output value Vd of the thermistor 11 for infrared ray detection and the output value Vc of the thermistor 12 for compensation.

The output of the differential amplifier circuit 430 is inputted into the (−) terminals of respective comparators 441 and 451. A voltage signal which is set as the first threshold is inputted into the (+) terminal of the comparator 441. For example, when the first threshold is set to 2.5 V, the power supply voltage of 3.3 V is to be divided into a resistance element 443 of 8 kΩ and a resistance element 442 of 25 kΩ. The comparator 441 outputs a low level signal when the difference output (Vc−Vd)×10 is larger than the first threshold, and outputs a high level signal when the difference output is smaller than the first threshold.

Similarly, a voltage signal which is set as the second threshold is inputted into the (+) terminal of the comparator 451. For example, when the second threshold is set to 2.8 V, the power supply voltage of 3.3 V is to be divided into a resistance element 453 of 5 kΩ and a resistance element 452 of 28 kΩ. The comparator 451 outputs a low level signal when the difference output (Vc−Vd)×10 is larger than the second threshold, and outputs a high level signal when the difference output is smaller than the first threshold.

In order to divide the determination range into two sections, the compensation output Vc is inputted into a comparator 461. For example, when the determination range is divided into one equal to or larger than 2.0 V and the other smaller than 2.0 V, the power supply voltage of 3.3 V is to be divided into a resistance element 463 of 13 kΩ and a resistance element 462 of 20 kΩ. The comparator 461 outputs a low level signal when the compensation output Vc is equal to or larger than 2.0 V, and outputs a high level signal when the compensation output is smaller than 2.0 V.

An output signal of the comparator 441 and an output signal of the comparator 461 which passes an operator element 473 are inputted into an operator element 471 for obtaining a logical product of these two signals. It should be noted that the operator element 473 is a NOT operator for inverting the output signal of the comparator 461. In other words, the operator element 471 is to function as determination means for making determination using the first threshold set by the comparator 441.

Moreover, the output signals of the comparators 451 and 461 are inputted into an operator element 472 for obtaining a logical product of these two signals; In other words, the operator element 472 is to function as determination means for making determination using the second threshold set by the comparator 451.

The determination circuit 40 obtains a logical sum of the output signals of the two operator elements 471 and 472 with an operator element 474 and outputs the logical sum as a determination result. The determination circuit 40 having the above structure outputs a low level signal when the value of the difference output (Vc−Vd)×10 for the compensation output Vc equal to or larger than 2.0 V exceeds the first threshold and when the value of the difference output (Vc−Vd)×10 for the compensation output is smaller than 2.0 V exceeds the second threshold.

In other words, the determination circuit 40 outputs a low level signal as a determination result when it is estimated that the surface temperature of the heating roller 71*a* is abnormal. It is therefore possible to prevent excessive temperature rise of the heating roller 71*a* by using the switching circuit 73 for breaking electric conduction to the heater 72 when the determination circuit 40 outputs a low level signal.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A fixing apparatus comprising:
   a heating roller comprising a heating unit;
   a pressure roller pressed against the heating roller;
   the fixing apparatus being configured to hold and heat a sheet, which carries an image formed by a developer, between the heating roller and the pressure roller so as to fix the image on to the sheet;
   a first sensor configured to detect radiant heat from the heating roller;
   a second sensor configured to detect an ambient temperature of the first sensor; and
   a controller capable of performing operations of:
   determining whether a temperature of the heating roller is abnormal or not based on an output value of the first sensor and an output value of the second sensor; and
   controlling an operating state of the heating unit based on the determination result.

2. The fixing apparatus according to claim 1, the controller is further capable of performing operations of:
   executing a predetermined calculation using the output value of the first sensor and the output value of the second sensor; and
   comparing a magnitude of the calculation result and a threshold set for the calculation result;
   wherein it is determined whether the temperature of the heating roller is abnormal or not based on the comparison result.

3. The fixing apparatus according to claim 2, wherein a plurality of thresholds to be compared with are set in accordance with the output value of the second sensor.

4. The fixing apparatus according to claim 1, the controller is further capable of performing operations of:
   calculating a difference value between the output value of the first sensor and the output value of the second sensor; and
   comparing a magnitude of the calculated difference value and a threshold set for the difference value;
   wherein it is determined whether the temperature of the heating roller is abnormal or not based on the comparison result.

5. The fixing apparatus according to claim 4, wherein a plurality of thresholds to be compared with are set in accordance with the output value of the second sensor.

6. The fixing apparatus according to claim 1, the controller is further capable of causing the heating unit to stop heating when it is determined that the temperature of the heating roller is abnormal.

7. The fixing apparatus according to claim 1, wherein the heating unit is constructed to generate heat upon electric conduction,
   and further comprises an electric conduction unit for allowing electric conduction to the heating unit; and
   a switching circuit for stopping electric conduction by the electric conduction unit when it is determined that the temperature of the heating roller is abnormal.

8. An image forming apparatus comprising:
   an accepting unit for accepting image data;
   a transfer unit for transferring an image formed by a developer onto a sheet based on the accepted image data; and
   a fixing apparatus described in claim 1; wherein
   an image is formed by fixing an image on the sheet, which has been transferred by the transfer unit, with the fixing apparatus.

9. A fixing apparatus comprising:
   a heating roller comprising heating means;
   a pressure roller pressed against the heating roller;
   the fixing apparatus being configured to hold and heat a sheet, which carries an image formed by a developer, between the heating roller and the pressure roller so as to fix the image on to the sheet;
   a first sensor configured to detect radiant heat from the heating roller;
   a second sensor configured to detect an ambient temperature of the first sensor;
   determination means configured to determine whether a temperature of the heating roller is abnormal or not based on an output value of the first sensor and an output value of the second sensor; and control means for controlling an operating state of the heating means based on the determination result by the determination means.

10. The fixing apparatus according to claim 9, wherein the determination means comprises calculation means for executing a predetermined calculation using the output value of the first sensor and the output value of the second sensor and means for comparing a magnitude of the calculation result by the calculation means and a threshold set for the calculation result, and determines whether the temperature of the heating roller is abnormal or not based on the comparison result.

11. The fixing apparatus according to claim 10, wherein a plurality of thresholds to be compared with are set in accordance with the output value of the second sensor.

12. The fixing apparatus according to claim 9, wherein the determination means comprises means for calculating a difference value between the output value of the first sensor and the output value of the second sensor and means for comparing a magnitude of the calculated difference value and a threshold set for the difference value, and determines whether the temperature of the heating roller is abnormal or not based on the comparison result.

13. The fixing apparatus according to claim 12, wherein a plurality of thresholds to be compared with are set in accordance with the output value of the second sensor.

14. The fixing apparatus according to claim 9, wherein the control means causes the heating means to stop heating when the determination means determines that the temperature of the heating roller is abnormal.

15. The fixing apparatus according to claim 9, wherein the heating means is constructed to generate heat upon electric conduction, and further comprises electric conduction means for allowing electric conduction to the heating means; and means for stopping electric conduction by the electric conduction means when the determination means determines that the temperature of the heating roller is abnormal.

16. An image forming apparatus comprising:

means for accepting image data;

transfer means for transferring an image formed by a developer onto a sheet based on the accepted image data; and a fixing apparatus described in claim 9; wherein an image is formed by fixing an image on the sheet, which has been transferred by the transfer means, with the fixing apparatus.

* * * * *